United States Patent [19]

Harnandez

[11] 3,984,867
[45] Oct. 5, 1976

[54] APPARATUS FOR MODIFYING THE TIME BASE OF SIGNALS
[75] Inventor: Victor M. Harnandez, Spencerport, N.Y.
[73] Assignee: Eastman Kodak Company, Rochester, N.Y.
[22] Filed: Mar. 5, 1975
[21] Appl. No.: 555,668

[52] U.S. Cl. ............................. 360/36; 178/6.6 TC; 178/69.5 DC; 333/18
[51] Int. Cl.² ........................................ H04N 5/785
[58] Field of Search ................ 360/36, 37, 51, 26, 360/27; 178/6, 6 TC, 69.5 DC, 69.5 TV, 69.5 F; 333/18

[56] References Cited
UNITED STATES PATENTS

| | | | |
|---|---|---|---|
| 2,960,568 | 11/1960 | Leyton | 178/6.6 |
| 3,202,769 | 8/1965 | Coleman | 360/36 |
| 3,235,662 | 2/1966 | Bopp | 178/6.6 TC |
| 3,238,300 | 3/1966 | Bopp | 178/69.5 |
| 3,424,861 | 1/1969 | Delvaux | 360/36 |
| 3,580,991 | 5/1971 | Krause | 178/6.6 |
| 3,758,711 | 9/1973 | Crosno | 360/36 |
| 3,868,516 | 2/1975 | Buss | 333/18 |
| 3,879,748 | 4/1975 | De Boer | 360/36 |

Primary Examiner—Bernard Konick
Assistant Examiner—Alan Faber
Attorney, Agent, or Firm—Robert F. Cody

[57] ABSTRACT

Time base instability of signals in a train thereof is corrected by use of a frequency controlled delay device. As employed in the correction of time base instability of video signals, a charge-coupled delay device is used. The delay device is clocked by a frequency which is proportional to the reciprocal of the phase difference between a fluttering input signal and a reference synchronizing signal. This corrects errors caused by the nonlinear transfer characteristics of the delay device, i.e. the transit time through the device is porportional to the reciprocal of the frequency of the clock signal which controls the delay device.

11 Claims, 2 Drawing Figures

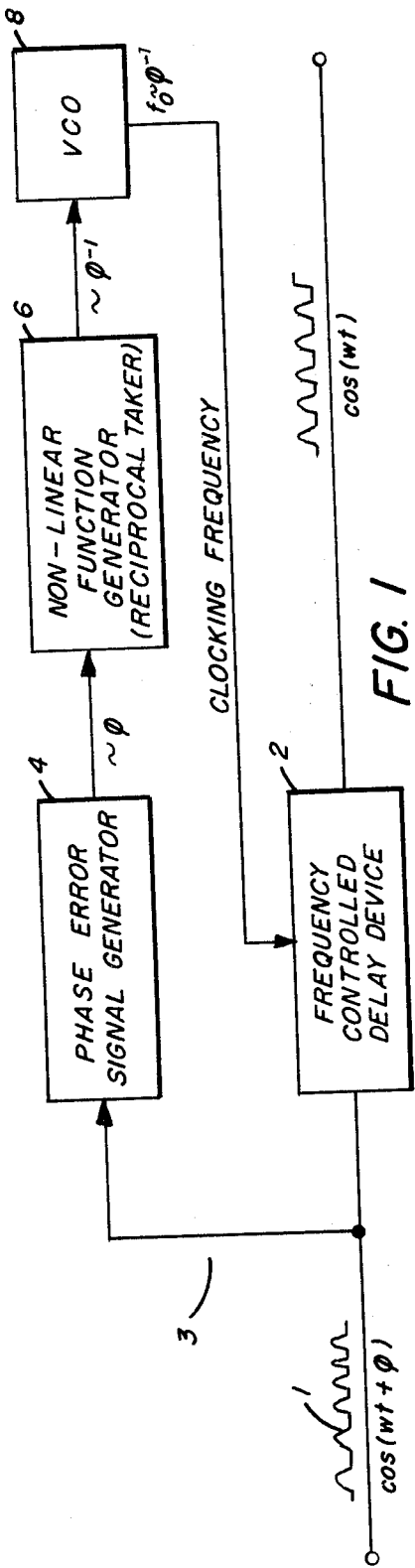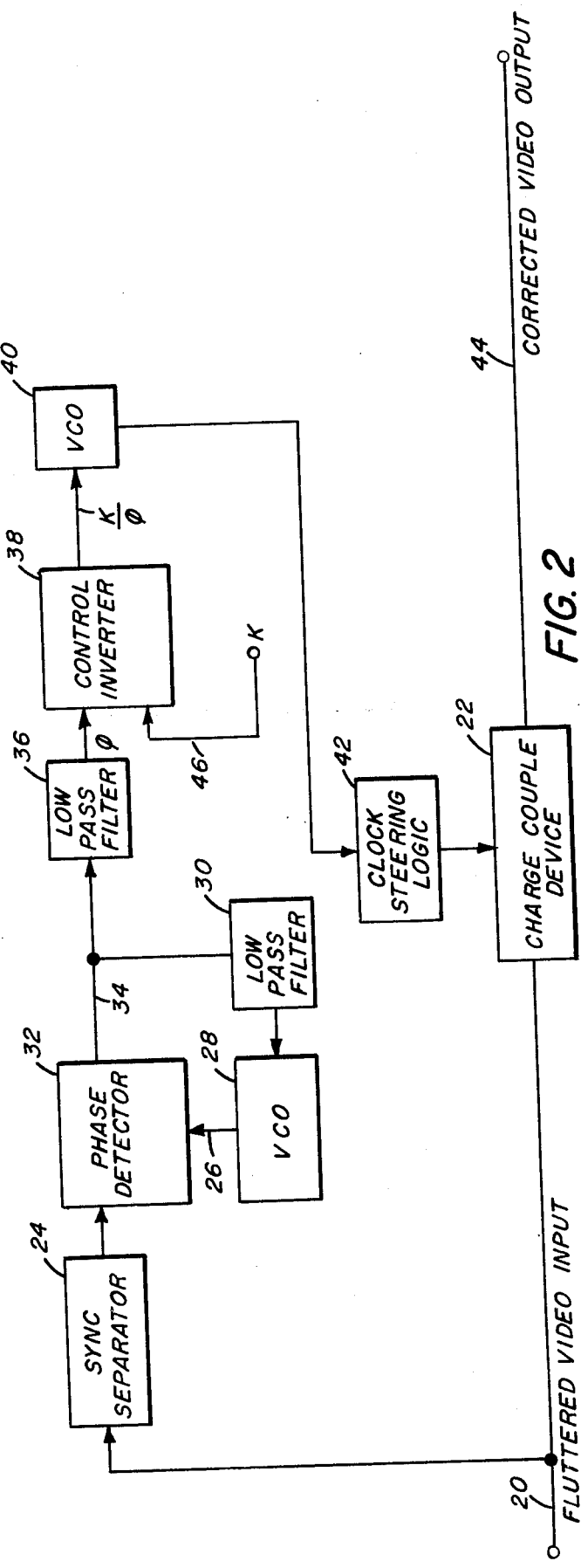

APPARATUS FOR MODIFYING THE TIME BASE OF SIGNALS

BACKGROUND OF THE INVENTION

1. Field of the Invention

This invention relates in general to apparatus for modifying the time base of signals in a train thereof; more particularly, the invention is concerned with apparatus for correcting a time base instability in television-type signals.

2. Description Relative to the Prior Art

While the invention is not so restricted, its utility as a flutter compensator in a video tape recorder dramatically indicates its significance. The playback of a taped video recording requires faithful replay of recorded signals without causing such signals to shift unwantedly and continuously in frequency. Unwanted frequency modulation of playback video signals can, among other things, cause (1) the sync information content of the video signal to become unstable, and (2) the color information content of the video to become, at best, faulty, i.e., color information may not be detectable at all, since unstable playback of recorded color burst information within the video signal may cause the color content of the video signal to be lost entirely.

The degree of unwanted frequency shift during playback of the video signal is measured in terms of "percent flutter", it being recognized that even fractional percent flutter will prevent the AFC circuits of most televisions from tracking the fluttering sync signal, resulting in the tearing apart of the visual display that corresponds to the playback signal. Percent flutter may be defined as 100 times a change in frequency divided by a nominal frequency, the nominal frequency in the present case being 15750 Hz.

To assure against instantaneous time base instability of played-back television signals which are derived from a video tape recorder, present practice is to employ extremely close tolerances in the precision parts of the recorder and to complement such tolerances with various servo controls which actively prevent flutter from occurring during playback. Such practices greatly add to the cost of manufacturing video tape recorders and, indeed, have prevented video recorders from being cost-wise within reach of many who would otherwise want them. This being the case, various proposals have been made to utilize variable delay lines, e.g., U.S. Pat. Nos. 2,960,568; 3,238,300; and 3,580,991, as a way to nullify flutter within playback signals. In one of the later versions, as shown in U.S. Pat. No. 3,580,991, the flutter within the played-back signals is detected and the "flutter" signal derived therefrom is used to vary the delay of a storage-type delay device through which the fluttering signal is passed. Thus, the output of the delay device is, hopefully, a flutter-free equivalent of the fluttering input to the delay device.

The prior art objective of providing a flutter correcting delay device depends on forcing the delay of the fluttering signal through the delay device to vary linearly with the unwanted frequency modulation of the signal. However, considering, for example, a frequency controlled storage-type delay device, the transit time of such a delay device varies nonlinearly with the frequency of the clock synchronizing pulses which clock a signal therethrough. Therefore, to produce the desired result, the delay device must be clocked in accordance with a varying pulse rate which compensates for the inherent nonlinearity of the delay device, thereby causing the delay to assume the desired linear relationship with respect to the unwanted frequency modulation. What this means is this: One cannot merely derive a signal corresponding to the frequency modulation; invert such signal, and then operate the frequency controlled delay device at a rate represented by the inverted signal. To do so, in effect, would merely cause the delay device to track, but never nullify, the unwanted frequency modulation.

Approaches taken heretofore to compensate for the "nonlinearity problem" include such proposals as illustrated in U.S. Patent No. 3,580,991, which requires the superimposition of the outputs from two phase comparator circuits in order to approach the desired result. Besides offering a result which only approximates the desired flutter-free signal, this approach also complicates the circuitry in the recorder by resort to dual comparator units and, of course, raises the cost thereof. Proposals have also been advanced to use one comparator circuit and to convert its analog output to a digital output in order to control a delay network. However, this approach requires expensive and complex analog-to-digital and digital-to-analog converters. Consequently, a quality flutter-free video recorder is still beyond the financial reach of many who would otherwise want one, particularly in a home or educational setting.

SUMMARY OF THE INVENTION

It is fundamental that a frequency discrepancy in the unwanted signal equates with the derivative of the phase discrepancy thereof $$(\text{i.e.}, f = \frac{d\phi}{dt}):$$

Recognizing that the phase error is the integral of the frequency error, the invention basically teaches the variable clocking of the fluttering signal through a frequency controlled delay device by a clock frequency which is proportional to the reciprocal of the phase error signal corresponding to the integral of the unwanted frequency modulation of the fluttering signal. Such a technique, as will be appreciated below, means that the delay device can be clocked in simple straightforward fashion while never having to hold charge on any stage thereof for an extended period of time. The clocking frequency may be set, on the one hand, to nullify the flutter of the fluttering signal or, on the other, it may be set at some multiple thereof to provide an unfluttered output signal which is some frequency multiple of the fluttering input signal.

In utilizing the invention process signals such as television-type signals, i.e., signals which are continuous and which have a nominal periodicity, the invention further proposes the clocking of a charge-coupled device by a clock frequency which is dependent on the reciprocal of the phase difference between a fluttering input synchronizing signal and a reference synchronizing signal. The use of such a clock frequency delays the fluttering input signal in direct linear relationship to the unwanted frequency modulation, thereby nullifying the flutter thereof and providing an unfluttered synchronizing signal at the output of the charge-coupled device.

BRIEF DESCRIPTION OF THE DRAWINGS

The invention will be described with reference to the figures, wherein:

FIG. 1 is a diagram useful in describing the basic teaching of the invention; and FIG. 2 is a block diagram illustrating a presently preferred embodiment of the invention.

DESCRIPTION OF THE INVENTION

Before describing the details of the invention, the basic philosophy employed in implementing the invention will be discussed in relation to FIG. 1. A signal 1 is shown being applied to a time base error corrector 3. The signal 1 is a function of $\cos(\omega t + \phi)$, where $\phi$ is a flutter-induced phase disturbance, t is a value of time, and $\omega$ is the angular velocity of the input signal, equaling $2\pi$ times the nominal frequency which, in this case, is the frequency of television horizontal synchronizing pulses, or 15750 Hz. The objective of passing the signal $\cos(\omega t + \phi)$ through the time base error corrector 3 is to introduce a delay $\tau$ which cancels the flutter component $\phi$ and leaves a nonfluttering signal $\cos(\omega t)$. This condition is achieved when the delay $\tau$ is made proportional to $\phi$, or more precisely when $\tau$ equals $(1/\omega)\phi$ in accordance with the following derivation:

| | | |
|---|---|---|
| 1. | $\cos(\omega t + \phi)$ | (The fluttering signal.) |
| 2. | $\cos(\omega(t-\tau) + \phi)$ $\cos(\omega t - \omega\tau + \phi)$ | (A delay $\tau$ is introduced so as to subtract from the time t.) |
| 3. | $\omega\tau = \phi$ | (The condition $\omega\tau = \phi$ is forced.) |
| 4. | $\cos(\omega t)$ | (The flutter component $\phi$ is cancelled by the effect of the delay $\tau$.) |

Keeping in mind the desired direct proportionality between the flutter component $\phi$ and the delay $\tau$, the fluttering signal is input to a phase error signal generator 4 which provides an output proportional to the flutter component $\phi$. The fluttering signal is also applied to a frequency controlled delay device 2 having a nonlinear transfer characteristic, i.e., the transit time or delay $\tau$ through the device is proportional to the reciprocal of the frequency $f_o$ of clock pulses applied to the delay device 2 from a voltage control oscillator (VCO) 8. Such a transfer characteristic has been largely ignored in the prior art; instead, it has been the prior art practice to vary the clocking frequency as a function of $(-\phi)$. According to the invention, a circuit is provided which complements the nonlinearity of the delay device 2 so as to provide the desired linear relationships between the unwanted frequency modulation of the signal $\cos(\omega t + \phi)$ and the delay through the delay device 2. This function is provided by a nonlinear function generator 6 which receives at its input a signal proportional to the phase flutter component $\phi$ and provides at its output a nonlinear signal that is proportional to the reciprocal of the flutter component $\phi$ which, as hereafter seen, precisely cancels the nonlinearity of the delay device 2:

| | | |
|---|---|---|
| 1. | $\tau \sim 1/f_o$ | (The delay $\tau$ is inversely proportional to the clock frequency $f_o$.) |
| 2. | $f_o \sim 1/\phi$ | (The clock frequency $f_o$ is proportional to the output of the nonlinear function generator, which is the inverse of the flutter component $\phi$.) |
| 3. | $\sim 1/[1/\phi] \sim \phi$ | (The delay $\tau$, therefore, is inversely proportional to the inverse of the flutter component $\phi$, or to the flutter component $\phi$ directly.) |

Turning now to FIG. 2, a schematic block diagram based on the above-mentioned analysis is shown. Assuming that a train of flutter-influenced television signals appears on line 20, the fluttering signals are applied simultaneously to a sync separator 24 and a frequency controlled delay device, such as an analog shift register which, in this embodiment, is illustrated by a charge-coupled device 22. The fluttering video signals include a horizontal synchronizing component which is subject to the time base error that requires elimination. An error-free reference in the form of horizontal synchronizing signals appears on a line 26. These are produced by a voltage controlled oscillator (VCO) 28 which is controlled as to frequency by the output of a phase detector adapted to receive the stripped sync signals and the reference signals. The phase detector 32 output is applied via a low pass filter 30 to the VCO 28, and all such circuits together form a phase lock loop having an output (line 34) which is proportional to the phase difference between the stripped sync signals and the reference signals. Since the phase angle is the time integral of frequency, the phase lock loop may also be considered as an integral controller with respect to frequency differences.

The low pass filter 30 has a relatively long time constant so that the phase detector 32 is basically insensitive to a low frequency drift of the video signal. Thus, the output on the line 34 contains signals indicative of the fluttering frequencies on the incoming video signal. The error signal on the line 34 is received at the input of a low pass filter 36, which has a relatively shorter time constant than that of the filter 30. The filter 36 functions to remove unwanted high frequency harmonics from the output of the phase detector 32.

The filtered phase error signal $\phi$ is next applied to a nonlinear function generator 38, e.g., a reciprocal taker, to produce the signal $$\frac{K}{\phi}.$$

Recalling that the desired delay in the fluttered video signal is provided by making the delay $\tau$ proportional to the flutter component $\phi$, it is apparent that the circuit 38 must provide one or more proportionality constants (constant K, line 46) to force the desired relationship. Other proportionality constants may be applied to the phase detector 32 and/or VCO 40 stages and thereby effect the value of the constant K. The output voltage provided by the circuit 38 is applied to a voltage controlled oscillator (VCO) 40 which is adapted to provide an output clock pulse whose frequency is proportional to the value of its input voltage. Since the input voltage to the VCO 40 is varying in synchronism with the reciprocal of the flutter, the clock pulse output from the VCO 40 is essentially an inversely fluttering clock. This fluttering clock pulses the charge-coupled device 22 via clock steering logic 42, whereby fluttering television signals appearing on the line 20 are converted to flutter-free signals on a line 44.

Pulses originating from the VCO 40, though varying frequency-wise in proportion to the reciprocal of the flutter component $\phi$, cause the charge-holding intervals of the stages of the charge-coupled device 44 to be relatively regular. This is a departure from the prior art practice which — because it results from clocking a delay device as a mere function of $(-\phi)$ — causes varying charge-holding intervals (which may be relatively long). The charge-holding interval, as above noted, is of considerable importance because it is determinative of the degree of noise degradation that affects the signals corresponding to charge packets as such packets are held in static positions within the device.

The invention has been described in detail with particular reference to preferred embodiments thereof, but it will be understood that variations and modifications can be effected within the spirit and scope of the invention.

What is claimed is:

1. Apparatus for correcting for time base instability of signals in a train thereof, comprising:
   a. a frequency controlled delay device;
   b. means for producing a clock signal having a frequency which occurs at a rate corresponding to the reciprocal of the time integral of the frequency instability of signals in said train thereof, both said reciprocal and time integral being of the same polarity; and
   c. means responsive to said clock signal for clocking signals in said train thereof through said frequency controlled delay device so that time base instability of signals in said train thereof is substantially eliminated.

2. The apparatus of claim 1 wherein said frequency controlled delay device comprises a charge-coupled device.

3. Apparatus for modifying the time base of signals in a train thereof, comprising:
   a. means for producing a phase error signal that varies as a function of phase variations in the time base of the signals in said train thereof;
   b. voltage variable delay means adapted to serially receive said train of signals and delay the progression of said train of signals completely therethrough in proportion to a control signal provided during said progression;
   c. signal means for receiving said error signal and for producing a signal of like polarity proportional to the reciprocal thereof, said reciprocal signal being said control signal; and
   d. means for applying said reciprocal signal to said voltage variable delay means for varying the delay of signals in said train in direct proportion to said reciprocal signal.

4. Apparatus for modifying the time base of signals in a train thereof, comprising:
   a. means for producing a variable frequency clock;
   b. means for producing a phase error signal that varies as a function of phase variations in the time base of the signals in said train thereof;
   c. means for varying the frequency of said clock in proportion to the reciprocal of said phase error signal, said reciprocal having the same polarity as said phase error signal; and
   d. frequency controlled delay means for receiving said train of signals, said delay means being responsive to said clock to pass said signals through said delay means at said varying clock frequency, whereby the time base of the signals in said train thereof is modified accordingly.

5. The apparatus of claim 4 wherein said frequency controlled delay means comprises a charge-coupled device.

6. Apparatus for removing flutter from a train of television line-representative signals, comprising:
   a. comparator means for comparing the phase of sync signals in said signal train with reference signals occurring at a nominal sync rate, thereby to produce a phase error signal;
   b. clock producing means responsive to said phase error signal for producing a clock signal having a frequency which varies reciprocally and with like polarity with respect to said phase error signal; and
   c. frequency controlled delay means for receiving said train of signals, said delay means being responsive to said clock producing means to clock said signals through said delay means.

7. The apparatus of claim 6 wherein said frequency controlled delay means comprises a charge-coupled device.

8. The apparatus of claim 6 wherein said comparator means comprises a phase lock loop further including a voltage controlled oscillator for providing a reference sync frequency and a phase detector adapted to compare the phase of the oscillator signal with the phase of sync signals in said train of television signals.

9. The apparatus of claim 6 wherein said clock producing means comprises:
   a. control means for generating a nonlinear output signal which is proportional to the reciprocal of said phase error signal; and
   b. voltage controlled oscillator means responsive to said nonlinear output signal for providing a clock signal having a frequency which varies directly with respect to said nonlinear output signal.

10. In combination with a video tape recorder, apparatus for removing flutter from a train of television line-representative signals played back by said recorder comprising:
    a. a voltage controlled oscillator for producing a reference frequency occurring at a nominal sync rate;
    b. phase detector means for comparing the phase of sync signals in said signal train which said reference signals and for producing a phase error signal;
    c. signal generator means responsive to said phase error signal for providing a nonlinear output signal of like polarity which is proportional to the reciprocal of said phase error signal;
    d. voltage controlled oscillator means responsive to said nonlinear output signal for generating a clock signal having a frequency which varies directly with respect to said nonlinear output signal;
    e. analog shift register means for processing said train of signals; and
    f. clock steering means for applying said clock signal to said analog shift register means, said analog shift register means being responsive to said clock signal to process said train of signals therethrough.

11. The apparatus of claim 10 wherein said analog shift register means comprises a charge-coupled device.

* * * * *

UNITED STATES PATENT AND TRADEMARK OFFICE
CERTIFICATE OF CORRECTION

PATENT NO. : 3,984,867
DATED : October 5, 1976
INVENTOR(S) : Victor M. Harnandez It is certified that error appears in the above-identified patent and that said Letters Patent are hereby corrected as shown below:

On the Title page, the inventor's name should read:

"VICTOR M. HERNANDEZ"

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*